(12) United States Patent
  Feller

(10) Patent No.: US 11,110,649 B2
(45) Date of Patent: Sep. 7, 2021

(54) ADDITIVELY MANUFACTURED PRODUCTS HAVING A MATTE SURFACE FINISH

(71) Applicant: Carbon, Inc., Redwood City, CA (US)

(72) Inventor: Bob E. Feller, San Mateo, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

(21) Appl. No.: 17/058,288

(22) PCT Filed: Nov. 22, 2019

(86) PCT No.: PCT/US2019/062731
§ 371 (c)(1),
(2) Date: Nov. 24, 2020

(87) PCT Pub. No.: WO2020/142144
PCT Pub. Date: Jul. 9, 2020

(65) Prior Publication Data
US 2021/0206052 A1    Jul. 8, 2021

Related U.S. Application Data

(60) Provisional application No. 62/788,198, filed on Jan. 4, 2019.

(51) Int. Cl.
| | | |
|---|---|---|
| *B29C 64/129* | (2017.01) | |
| *C08K 3/013* | (2018.01) | |
| *C08K 5/00* | (2006.01) | |
| *B33Y 10/00* | (2015.01) | |
| B33Y 80/00 | (2015.01) | |
| B29K 105/00 | (2006.01) | |
| B29L 31/50 | (2006.01) | |
| B29K 75/00 | (2006.01) | |

(52) U.S. Cl.
CPC ............ *B29C 64/129* (2017.08); *B33Y 10/00* (2014.12); *C08K 3/013* (2018.01); *C08K 5/0041* (2013.01); B29K 2075/00 (2013.01); B29K 2105/0032 (2013.01); B29K 2995/0025 (2013.01); B29L 2031/504 (2013.01); B33Y 80/00 (2014.12)

(58) Field of Classification Search
CPC ....... B29C 64/129; B33Y 10/00; B33Y 80/00; C08K 3/013; C08K 5/0041; B29K 2075/00; B29K 2995/0025; B29K 2105/0032; B29L 2031/504
See application file for complete search history.

(56) References Cited

U.S. PATENT DOCUMENTS

| | | |
|---|---|---|
| 5,236,637 A | 8/1993 | Hull |
| 5,391,072 A | 2/1995 | Lawton et al. |
| 5,529,473 A | 6/1996 | Lawton et al. |
| 6,867,548 B2 | 3/2005 | Eden et al. |
| 7,438,846 B2 | 10/2008 | John |
| 7,482,750 B2 | 1/2009 | Eden et al. |
| 7,892,474 B2 | 2/2011 | Shkolnik et al. |
| 8,110,135 B2 | 2/2012 | El-Siblani |
| 8,900,027 B2 | 12/2014 | Bulson et al. |
| 9,205,601 B2 | 12/2015 | Desimone et al. |
| 9,211,678 B2 | 12/2015 | Desimone et al. |
| 9,216,546 B2 | 12/2015 | Desimone et al. |
| 9,453,142 B2 | 9/2016 | Rolland et al. |
| 9,598,606 B2 | 3/2017 | Rolland et al. |
| 9,676,963 B2 | 6/2017 | Rolland et al. |
| 10,259,171 B2 | 4/2019 | Robeson et al. |
| 10,434,706 B2 | 10/2019 | Robeson et al. |
| 2006/0054039 A1* | 3/2006 | Kritchman ............ B33Y 10/00 101/424.1 |
| 2010/0081218 A1* | 4/2010 | Hardin ................. H01L 33/508 438/7 |
| 2013/0292862 A1 | 11/2013 | Joyce |
| 2013/0295212 A1 | 11/2013 | Chen et al. |
| 2015/0190964 A1* | 7/2015 | Okamoto .............. B33Y 30/00 428/192 |
| 2015/0331402 A1 | 11/2015 | Lin et al. |
| 2015/0360419 A1 | 12/2015 | Willis et al. |
| 2016/0263838 A1 | 9/2016 | Goldman et al. |
| 2016/0288376 A1 | 10/2016 | Sun et al. |
| 2017/0120650 A1* | 5/2017 | Miller ................ A43B 23/0235 |

(Continued)

FOREIGN PATENT DOCUMENTS

| | | | |
|---|---|---|---|
| WO | 2015164234 A1 | 10/2015 | |
| WO | 2017210298 A1 | 12/2017 | |

OTHER PUBLICATIONS

International Search Report and Written Opinion corresponding to PCT/US2019/062731; dated Mar. 3, 2020 (10 pages).

(Continued)

*Primary Examiner* — Nahida Sultana
(74) *Attorney, Agent, or Firm* — Myers Bigel, P.A

(57) ABSTRACT

Provided herein is a method of making an object having a matte surface finish by stereolithography. The method may include: (a) stereolithographically producing an intermediate object by polymerization of a dual cure resin with a first light having a first peak wavelength, the object having excess unpolymerized resin retained on the surface thereof; (b) separating a portion of said excess unpolymerized resin from said object while leaving a thin film of unpolymerized resin on the surface thereof; (c) partially curing said thin film by exposing said thin film to a second light at a second peak wavelength; and then (d) further curing said intermediate object by heating, microwave irradiating, or both heating and microwave irradiating, to produce an object having a matte surface finish.

20 Claims, No Drawings

(56) References Cited

U.S. PATENT DOCUMENTS

| | | |
|---|---|---|
| 2017/0129167 A1 | 5/2017 | Castanon |
| 2017/0129169 A1* | 5/2017 | Batchelder et al. |
| 2018/0126630 A1* | 5/2018 | Panzer .................. B29C 64/129 |
| 2018/0186082 A1* | 7/2018 | Randhawa ............ B23K 26/125 |
| 2018/0243976 A1* | 8/2018 | Feller .................... B29C 64/129 |
| 2018/0290374 A1 | 10/2018 | Willis et al. |
| 2019/0160733 A1 | 5/2019 | Mirkin et al. |

OTHER PUBLICATIONS

Janusziewicz, Rima, et al., "Layerless fabrication with continuous liquid interface production", PNAS, 113, 2016, 11703-11708.

Schubert, Rolf, et al., "VUV-induced micro-folding of acrylate-based coatings: 2. Characterization of surface properties", Surface and Coatings Technology, 203(24), 2009, 3734-3710.

Tumbleston, John R., et al., "Continuous liquid interface production of 3D Objects", Science, 347(6228), 2015, 1349-1352.

Vaidya, Nina, et al., "3D printed optics with nanometer scale surface roughness", Microsystems & Nanoengineering 4(Article 18), 2018, 1-8.

* cited by examiner

ADDITIVELY MANUFACTURED PRODUCTS HAVING A MATTE SURFACE FINISH

CROSS REFERENCE TO RELATED APPLICATIONS

This application is a 35 U.S.C. § 371 national phase application of International Application Serial No. PCT/US2019/062731, filed Nov. 22, 2019, which claims priority to U.S. Provisional Application Ser. No. 62/788,198, filed Jan. 4, 2019, the entire contents of which are hereby incorporated by reference.

FIELD OF THE INVENTION

The present invention concerns methods of surface finishing objects produced by additive manufacturing.

BACKGROUND OF THE INVENTION

A group of additive manufacturing techniques sometimes referred to as "stereolithography" creates a three-dimensional object by the sequential polymerization of a light polymerizable resin. Such techniques may be "bottom-up" techniques, where light is projected into the resin on the bottom of the growing object through a light transmissive window, or "top down" techniques, where light is projected onto the resin on top of the growing object, which is then immersed downward into the pool of resin.

The recent introduction of a more rapid stereolithography technique known as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678; 9,205,601; and U.S. Pat. No. 9,216,546 to DeSimone et al.; and also J. Tumbleston, D. Shirvanyants, N. Ermoshkin et al., Continuous liquid interface production of 3D Objects, *Science* 347, 1349-1352 (2015); see also Rolland et al., U.S. Pat. Nos. 9,676,963, 9,453,142 and 9,598,606).

A problem encountered with the production of objects from dual cure resins is that washing of the objects to remove excess resin prior to second cure can alter the chemistry of the objects. While this can be avoided by cleaning excess resin by techniques such as wiping or spinning, these can leave a film on the object which—when subsequently cured—imparts a glossy surface finish to the object. For many products, consumers perceive a glossy finish as inferior, or for some applications (such as where the object contacts the skin or clothing of a user) a glossy finish can have undesirable performance characteristics. Accordingly, there is a need for techniques that impart a matte surface finish to such objects.

SUMMARY OF THE INVENTION

Provided herein according to some embodiments is a method of making an object having a matte surface finish by stereolithography, comprising the steps of:

(a) stereolithographically producing an intermediate object by polymerization of a dual cure resin with a first light having a first peak wavelength, the object having excess unpolymerized resin retained on the surface thereof;

(b) separating a portion of said excess unpolymerized resin from said object while leaving a thin film of unpolymerized resin on the surface thereof;

(c) partially curing said thin film by exposing said thin film to a second light at a second peak wavelength; and then (d) further curing said intermediate object by heating, microwave irradiating, or both heating and microwave irradiating, to produce an object having a matte surface finish.

In some embodiments, the second peak wavelength is shorter than said first peak wavelength (for example, wherein said first peak wavelength is at least 60 or 100 nanometers longer than said second peak wavelength).

In some embodiments, the first peak wavelength is between 360 and 400 nanometers (and for example said first light has a full width at half maximum not more than 20 or 40 nanometers).

In some embodiments, the second peak wavelength is between 100 or 150 nanometers and 200 or 250 nanometers (and for example said second light has a full width at half maximum not more than 20 or 40 nanometers).

In some embodiments, the separating step is carried out by spinning, blowing with a compressed gas, gravity draining, or a combination thereof.

In some embodiments, the object comprises a lattice. In some embodiments, the object comprises a cushion (e.g., a midsole).

In some embodiments, the object comprises a body contact surface (e.g., a seat cushion, arm rest, heat rest, handle, steering wheel, or component thereof). In some embodiments, the object comprises a skin contact surface (e.g., a helmet liner).

In some embodiments, the object is comprised of:
(a) polyurethane, polyurea, or a copolymer thereof;
(b) epoxy;
(c) silicone; or
(d) cyanate ester.

In some embodiments, the object is opaque. In some embodiments, the resin comprises at least one pigment (e.g., white, black, cyan, magenta, yellow, or a combination thereof).

In some embodiments, the producing step is carried out by bottom-up or top-down stereolithography.

In some embodiments, the object of steps (b), (c) and (d) is unwashed. In some embodiments, the retained portion of said resin is undiluted with solvent (e.g., not diluted with solvent during step (b)) during said partially curing of step (c).

In some embodiments, the partially curing step (c) further comprises exposing said intermediate object to light at a third wavelength longer than said second wavelength, before exposing said object to light at said second wavelength, to partially decrease the matting of said finish, prior to said further curing step (d).

In some embodiments, the partially curing step (c) further comprises exposing said said intermediate object to light at a fourth wavelength longer than said second wavelength, before and/or after exposing said object to light at said second wavelength, to stabilize said matte finish, prior to said further curing step (d).

Also provided is an object produced by the method of any preceding claim.

N. Vaidya and O. Solgaard, 3*D printed optics with nanometer scale surface roughness*, Microsystems & Nanoengineering 4:18 (2018), describe a method for surface finishing objects produced by stereolithography in which the object is washed, degassed in a vacuum, brush coated with a UV curable gel, again placed in a vacuum, spun or drained by gravity if needed, and then UV cured, to surface finish the objects. In contrast to the present invention, products of the Vaidya and Solgaard process are smooth, and intended for optical applications, as opposed to the matte finish imparted to the objects produced by the present process.

R. Schubert et al., *VUV-induced micro folding of acrylate-based coatings* 2. *Characterization of surface properties*, Surface & Coatings Technology 203, 3734-3740 (2009), describe the production of "physically matted" coatings by a vacuum UV treatment, but do not suggest such materials be applied to an additively manufactured product, and do not suggest that the same resin from which the three-dimensional object is produced can advantageously be employed to achieve a matte surface finish.

The foregoing and other objects and aspects of the present invention are explained in greater detail in specification set forth below. The disclosures of all United States patent references cited herein are to be incorporated herein by reference.

DETAILED DESCRIPTION OF ILLUSTRATIVE EMBODIMENTS

The present invention is now described more fully hereinafter with reference to embodiments of the invention. This invention may, however, be embodied in many different forms and should not be construed as limited to the embodiments set forth herein; rather these embodiments are provided so that this disclosure will be thorough and complete and will fully convey the scope of the invention to those skilled in the art.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprised of," "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations of one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly-used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention, 1. Resins and Additive Manufacturing Steps.

Dual cure resins are preferred for carrying out the present invention. Such resins are known and described in, for example, U.S. Pat. Nos. 9,676,963, 9,453,142 and 9,598,606 to Rolland et al. Particular examples of suitable dual cure resins include, but are not limited to, Carbon Inc. medical polyurethane, elastomeric polyurethane, rigid polyurethane, flexible polyurethane, cyanate ester, epoxy, and silicone dual cure resins, all available from Carbon, Inc., 1089 Mills Way, Redwood City, Calif. 94063 USA.

Techniques for producing an intermediate object, or "green" intermediate, from such resins by additive manufacturing are known. Suitable techniques include bottom-up and top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step is carried out by one of the family of methods sometimes referred to as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, *Science* 347, 1349-1352 (2015); and in R. Janusziewcz et al., Layerless fabrication with continuous liquid interface production, *Proc. Natl. Acad. Sci. USA* 113, 11703-11708 (2016). Other examples of methods and apparatus for carrying out particular embodiments of CLIP include, but are not limited to: Batchelder et al., US Patent Application Pub. No. US 2017/0129169 (May 11, 2017); Sun and Lichkus, US Patent Application Pub. No. US 2016/0288376 (Oct. 6, 2016); Willis et al., US Patent Application Pub. No. US 2015/0360419 (Dec. 17, 2015); Lin et al., US Patent Application Pub. No. US 2015/0331402 (Nov. 19, 2015); D. Castanon, S Patent Application Pub. No. US 2017/0129167 (May 11, 2017); L. Robeson et al., PCT Patent Pub. No. WO 2015/164234 (see also U.S. Pat. Nos. 10,259,171 and 10,434,706); C. Mirkin et al., PCT Patent Pub. No. WO 2017/210298 (see also US Pat. App. US 2019/0160733); B. Feller, US Pat App. Pub. No. US 2018/0243976 (published Aug. 30, 2018); M. Panzer and J. Tumbleston, US Pat App Pub. No. US 2018/0126630 (published May 10, 2018); and K. Willis and B. Adzima, US Pat App Pub. No. US 2018/0290374 (Oct. 11, 2018).

2. Residual Resin Separation and Light Exposure.

After the object is formed by additive manufacturing, resin retained on the surface thereof is partially removed. This removal may be by any suitable technique, including simply gravity draining, but spinning of the part sufficient to centrifugally separate some of the resin is preferred, and blowing the resin off with a compressed gas (e.g., air, nitrogen, etc.), either manually or by passing the object under an air knife, is also preferred.

After partial separation of the resin, the remaining resin is further polymerized on the surface by exposure to light (e.g., ultra-violet light) at an appropriate intensity and duration. Such exposure may be carried out by any suitable technique, such as by placing a batch of objects in a light box, passing the objects through a light tunnel, etc.

In some embodiments, the light is at a shorter UV wavelength than that used for the additive manufacturing step. For example, the additive manufacturing may use a first peak wavelength of from 350 or 360 nanometers (nm) to 400 nm, such as 350 nm, 360 nm, 370 nm, 380 nm, 385 nm, 390 nm, etc., and the second exposure may be at a second peak wavelength of from 100 or 150 to 200 or 250 nm, such as 172 nm. Suitable illumination devices for use in delivering the second wavelength include, but are not limited to, those described in U.S. Pat. Nos. 6,867,548; 7,482,750; and 8,900,027, the disclosures of which are incorporated herein by reference. Suitable illumination devices include but are not limited to those available from Eden Park Illumination, 904 N. Country Fair Dr., Champaign, Ill. 61821 USA (sometimes referred to as eximer lamps). Such devices may be incorporated into a batch-type light box, or a tunnel-type conveyor (or continuous) light box, each with an optional unique identifier reader (such as an NFC or RFID tag reader) to read a unique identifier associated with objects being treated to document the specific treatment received by such objects, in accordance with known techniques. The boxes may optionally be nitrogen purged, and may optionally include warming features, depending on the resins employed, the particular effect desired, and the particular objects being treated.

In some embodiments, the first peak wavelength and/or the second peak wavelength has a full width at half maximum of not more than 20 or 40 nm.

Multiple different light exposures may be employed during this step, as noted above and below, to tune and/or stabilize the matte surface finish. For example, the intermediate object may be exposed to light at a third wavelength longer than the second wavelength, before exposing the object to light at the second wavelength, to partially decrease the matting of said finish, prior to heat curing. The intermediate object may also be exposed to light at a fourth wavelength longer than the second wavelength, before and/or after exposing the object to light at the second wavelength, to stabilize said matte finish, prior to heat curing.

3. Further Curing.

Once the intermediate object has been exposed to light, the object is then further cured, such as by heating. Heating may be active heating (e.g., baking in an oven, such as an electric, gas, solar oven or microwave oven, or combination thereof), or passive heating (e.g., at ambient (room) temperature). Active heating will generally be more rapid than passive heating and is typically preferred, but passive heating—such as simply maintaining the intermediate at ambient temperature for a sufficient time to effect further cure—may in some embodiments also be employed.

The present invention is further described in the following non-limiting examples.

Example 1

An object comprising an open lattice structure, such as a footware midsole, is produced as a green intermediate from Carbon Inc. elastomeric polyurethane resin on a Carbon Inc. M2 additive manufacturing apparatus (both available from Carbon Inc., Redwood City USA), in accordance with known techniques. Following the additive manufacturing step, excess resin is centrifugally separated from the surface of the object by spinning the object, leaving a thin coating of resin on the surface thereof. After centrifugal separation, the green intermediate object is exposed to ultraviolet light in a light box at a wavelength of 172 nanometers. Optionally, the green object may then be held in a nitrogen-purged box, and optionally warmed, to reduce "skin" formation in some embodiments where residual amines in the resin may react with carbon dioxide in the air. The green intermediate object is then baked in accordance with standard techniques to produce a finished object having a matte surface finish.

Example 2

This example is carried out in like manner as example 1 above, except that, after centrifugal separation but before exposure to light at 172 nanometers, the object is exposed to light in the light box at a wavelength of 365 or 385 nanometers, for a time sufficient to "tune" the matte finish by reducing the degree of texture of the matte finish.

Example 3

This example is carried out in like manner as either example 1 or 2 above, except that, after exposure to light at 172 nanometers but before baking, the object is exposed to light in the light box at a wavelength of 365 or 385 nanometers, for a time sufficient to stabilize the matte finish so that it is less susceptible to damage by handing prior to the baking step.

The foregoing is illustrative of the present invention, and is not to be construed as limiting thereof. The invention is defined by the following claims, with equivalents of the claims to be included therein.

What is claimed is:

1. A method of making an object having a matte surface finish by stereolithography, comprising the steps of:
    (a) stereolithographically producing an intermediate object by polymerization of a dual cure resin with a first light having a first peak wavelength, the object having excess unpolymerized resin retained on the surface thereof;
    (b) separating a portion of said excess unpolymerized resin from said object while leaving a thin film of unpolymerized resin on the surface thereof;
    (c) partially curing said thin film by exposing said thin film to a second light at a second peak wavelength; and then
    (d) further curing said intermediate object by heating, microwave irradiating, or both heating and microwave irradiating, to produce an object having a matte surface finish.

2. The method of claim 1, wherein said second peak wavelength is shorter than said first peak wavelength.

3. The method of claim 1, wherein said first peak wavelength is at least 60 nanometers longer than said second peak wavelength.

4. The method of claim 1, wherein said first peak wavelength is between 360 and 400 nanometers.

5. The method of claim 1, wherein said first light has a full width at half maximum of not more than 40 nanometers.

6. The method of claim 1, wherein said second peak wavelength is between 100 nanometers and 250 nanometers.

7. The method of claim 1, wherein said second light has a full width at half maximum of not more than 40 nanometers.

8. The method of claim 1, wherein said separating step is carried out by spinning, blowing with a compressed gas, gravity draining, or a combination thereof.

9. The method of claim 1, wherein said object comprises a lattice.

10. The method of claim 1, wherein said object comprises a cushion.

11. The method of claim 1, wherein said object comprises a body contact surface.

12. The method of claim 1, wherein said object comprises a skin contact surface.

13. The method of claim 1, wherein said object is comprised of:
   (a) polyurethane, polyurea, or a copolymer thereof;
   (b) epoxy;
   (c) silicone; or
   (d) cyanate ester.

14. The method of claim 1, wherein said object is opaque.

15. The method of claim 1, wherein said resin comprises at least one pigment.

16. The method of claim 1, wherein said producing step is carried out by bottom-up or top-down stereolithography.

17. The method of claim 1, wherein said object of steps (b), (c) and (d) is unwashed.

18. The method of claim 1, wherein said retained portion of said resin is undiluted with solvent during said partially curing of step (c).

19. The method of claim 1, wherein said partially curing step (c) further comprises exposing said intermediate object to light at a third wavelength longer than said second wavelength, before exposing said object to light at said second wavelength, to partially decrease the matting of said finish, prior to said further curing step (d).

20. The method of claim 1, wherein said partially curing step (c) further comprises exposing said intermediate object to light at a fourth wavelength longer than said second wavelength, before and/or after exposing said object to light at said second wavelength, to stabilize said matte finish, prior to said further curing step (d).

\* \* \* \* \*